Dec. 26, 1933.  F. L. KALLAM  1,940,802
CONTROL DEVICE FOR FRACTIONATORS AND THE LIKE
Filed Dec. 9, 1929  2 Sheets-Sheet 1
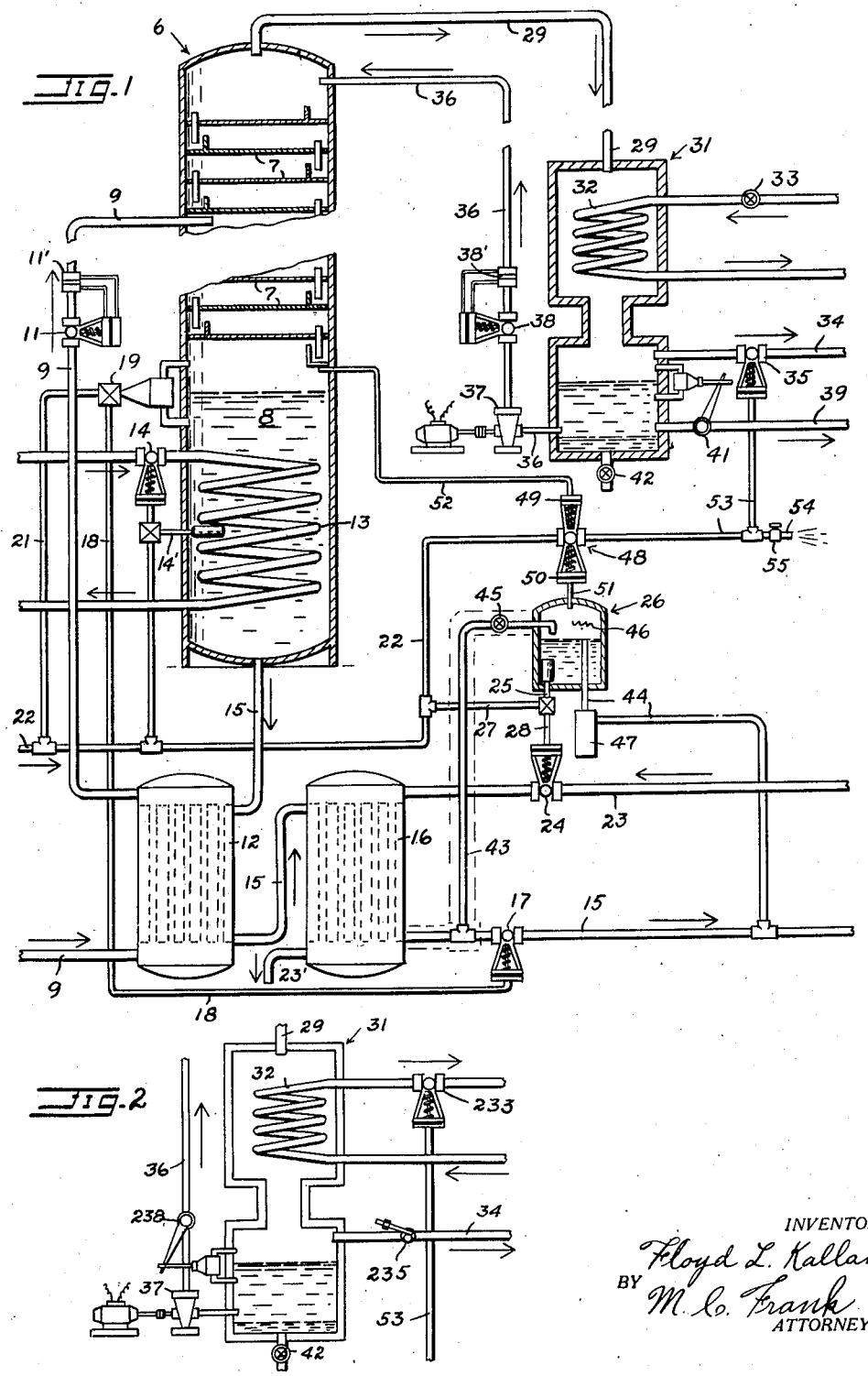
INVENTOR.
Floyd L. Kallam
BY M. C. Frank
ATTORNEY.

Dec. 26, 1933.    F. L. KALLAM    1,940,802
CONTROL DEVICE FOR FRACTIONATORS AND THE LIKE
Filed Dec. 9, 1929    2 Sheets-Sheet 2
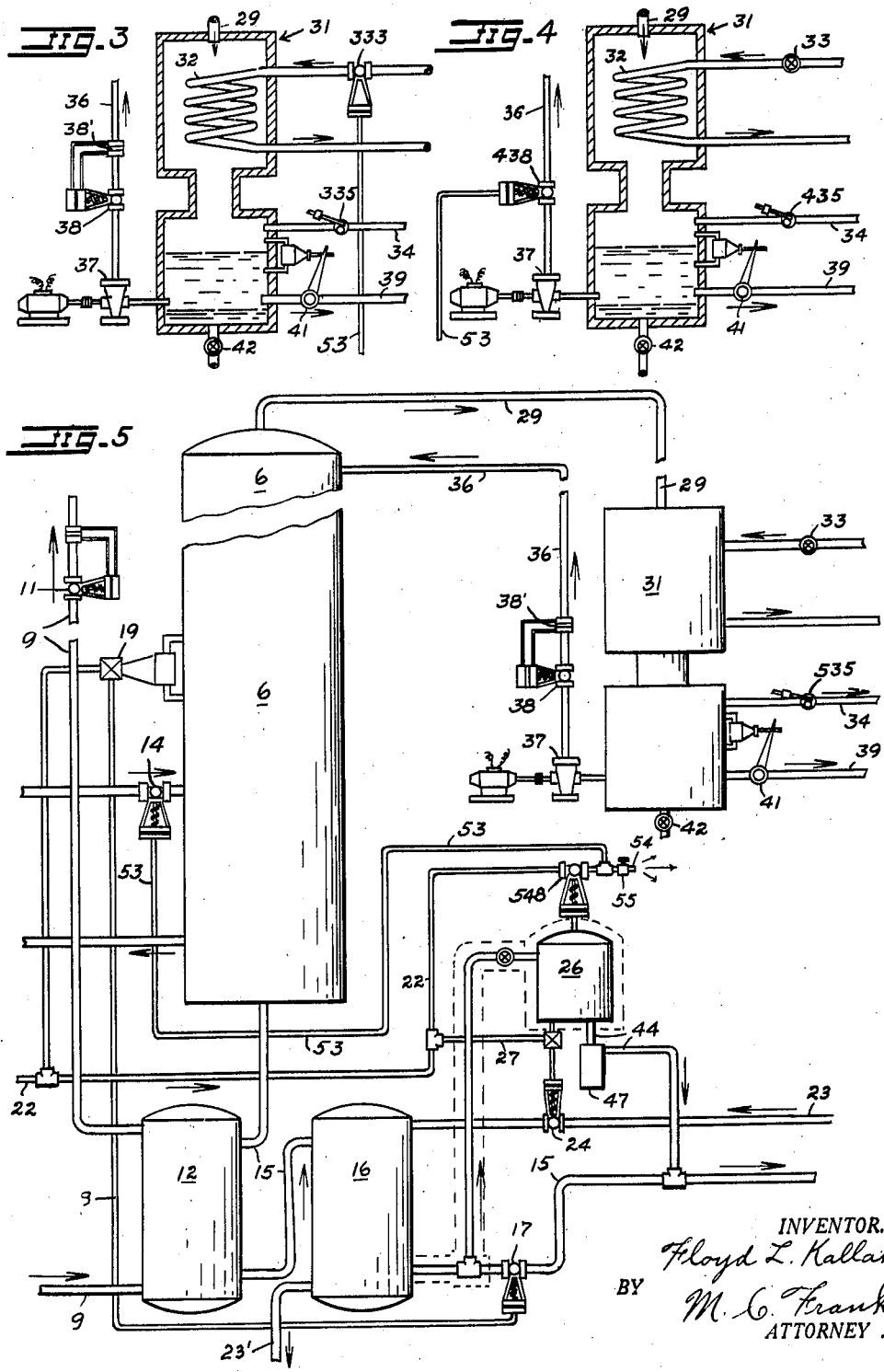
INVENTOR.
Floyd L. Kallam
BY
M. C. Frank
ATTORNEY.

Patented Dec. 26, 1933

1,940,802

UNITED STATES PATENT OFFICE 1,940,802

CONTROL DEVICE FOR FRACTIONATORS AND THE LIKE

Floyd L. Kallam, South Gate, Calif.

Application December 9, 1929. Serial No. 412,646

2 Claims. (Cl. 196—132)

The invention relates to a device for stabilizing a product of a continuously operating distilling rectifier or fractionator.

An object of the invention is to provide, in association with a fractionating apparatus, means automatically operative to so control a refined liquid product thereof that said product will be of constant volatility.

Another object of the invention is to directly utilize the volatility of the aforesaid product for effecting said automatic control of the apparatus.

A further object is to produce a product at a constant discharge temperature.

Yet another object is to provide a device of the character described which is readily applicable as an accessory to fractionating apparatus of present design.

The invention possesses other objects and features of advantage, some of which, with the foregoing, will be set forth or be apparent in the following description of typical applications of the invention which are illustrated in the accompanying drawings, in which:

Figure 1 is a generally diagrammatic elevation showing one application of the device of the present invention to a fractionating apparatus of standard structure, certain elements of the apparatus and device being shown in sectional elevation.

Figures 2, 3, and 4 are fragmentary views showing optional applications of the device to the apparatus shown in Figure 1.

Figure 5 is a generally diagrammatic elevation showing still another application of the present device to the aforesaid apparatus.

As particularly illustrated, the device of the present invention is operatively associated with fractionating apparatus in which the controlled product comprises a mixture of the less volatile fractions of hydro-carbon liquids such as fuel oils and gasolines. The apparatus shown is seen to comprise a conventional bubble-tray tower 6 having provided in the upper and major portion thereof a plurality of superimposed bubble-trays 7 of suitable structure. The lower tower portion is seen to provide a kettle-portion 8 to heat the liquid being treated. A duct 9 supplies the raw liquor to the bubble trays at a constant rate; as shown, a valve 11 is provided for controlling the flow of liquor through the duct 9 and a heat-exchanger 12 is interposed in said duct whereby to preheat said liquor.

The liquid in the kettle 8 is arranged to be heated to a desired temperature by means of a heating coil 13 through which a heated fluid is continuously passed; in practice, the heating fluid is usually steam and the liquid in the kettle is heated to boiling therewith. A valve 14 controls the fluid flow through the coil whereby, with the other operative factors of the apparatus constant, the rate of heat discharge from the coil may be adjusted to a desired value.

The unevaporated liquid is arranged to constantly escape at the bottom of the kettle through a duct 15. As particularly disclosed, the heat-exchanger 12 is interposed in the duct 15 whereby the inflowing liquor in the duct 9 is preheated and the liquid discharging through the duct 15 is partially cooled therein. A second heat-exchanger 16 is interposed in the duct 15 at the delivery side of the heat-exchanger 12 for completing the cooling of the discharged liquid.

For maintaining a constant liquid level in the kettle, a valve 17 is provided in the duct 15 at the discharge side of the heat-exchanger 16. The valve 17 is preferably arranged for automatic operation; as shown, this valve is of the diaphragm-motor type and is connected by means of an air duct 18 with a float-controlled valve 19 which is operated by the liquid level in the kettle. A duct 21 supplies the operating air to the valve 19 from a compressed-air main 22 connected with a suitable source (not shown) of compressed air. It is noted, however, that the valve 17 might be arranged for mechanical, rather than pneumatic, operation by a suitable float actuated mechanism.

A cooling liquid from any suitable source (not shown) is arranged to flow to and from the heat-exchanger 16 through ducts 23 and 23' respectively, and a flow control valve 24 is provided in a said duct. Both generally, and for a specific purpose to be hereinafter brought out, it is desirable that the liquid product be delivered through the duct 15 at a fixed and predetermined temperature, and automatic control of said temperature is conveniently arranged to be effected through the valve 24. As shown, the valve 24 is arranged for thermostatic control in accordance with the temperature of said product by means of a thermostat 25 having the bulb thereof immersed in the liquid in a sampling cup 26 through which a continuous sample of the said product is arranged to pass. In the present instance, the valve 24 is of the diaphragm motor type for operation by air pressure and the thermostat 25 includes an air valve connected with the air main 22 by a duct 27 and to the valve 24 by a duct 28. In this manner, a product of constant temperature is arranged to be delivered from the duct 15 and through the cup 26.

The gaseous products resulting from the heating, and other treatments, of the raw liquor in the tower 6 are arranged to flow from the top of the tower through a duct 29 and to a dephlegmator or condenser 31 wherein a portion of the gases are condensed to form what is known in the art as a reflux liquid. The desired cooling in the condenser 31 is arranged to be effected by means of a cooling coil 32, a valve 33 controlling the fluid flow rate through the coil. The uncondensed gases from the condenser 31 are arranged to escape, as to waste or for use as fuel, through a duct 34 having interposed therein a back-pressure valve 35. Part of the condensate, or reflux, in the condenser 31 is arranged to be delivered back to the tower 6 through a duct 36, a motor driven pump 37 being interposed in the said duct for the purpose. A valve 38 is also interposed in said duct at the discharge side of the pump 37. Excess reflux is arranged to be discharged from the condenser through a duct 39, the latter duct having therein a float-controlled valve 41 for automatic operation to maintain a constant reflux level in the condenser. A drain valve 42 for removing condensed water is preferably provided at the bottom, or accumulator portion, of the condenser.

It will now be understood that the present apparatus is arranged to fractionate the raw liquor delivered thereto into three fractions, namely, a heavier, or low volatility fraction which is discharged through the duct 15 as a liquid product, an intermediate fraction which is discharged through the duct 39 as reflux liquid, and the lighter, or high volatility, fraction which is discharged through the duct 34 in gaseous form. With the various control valves set, an operative balance of the pressure and temperatures in the apparatus is created and the aforesaid products are each produced under fixed conditions of pressure and temperature. If the raw liquor is of constant composition, the said products will all be of constant composition, and continuous operation of the apparatus would continuously produce uniform products.

As a matter of fact, raw liquors, such as crude oils and natural gasolines from wells, are very seldom of an unvarying composition, hence fractions thereof which are separated in unregulated refining apparatus are neither of constant composition nor volatility. No regulation of the apparatus is generally possible for the production of products which are of both constant composition and volatility, and adjustment of the apparatus must be made for either one or the other of said qualities rather than for both. Generally, though not exclusively, in the art of refining natural liquid hydro-carbons to produce fuels, the production of a product of constant volatility is of major importance, and it is to the provision of an automatically operable control means for continuously producing a product of constant volatility that the present invention particularly relates.

In the apparatus shown, the aforesaid operating conditions are seen to be chiefly controlled by the supply valve 11, the heating-coil valve 14, the condenser coil valve 33, the back-pressure valve 35, and the return-reflux valve 38, all of said valves being constantly open to some degree. Assuming the system operatively balanced, a change in the setting of any one of the aforesaid valves will change the volatilities and compositions of all three products by causing a new pressure-temperature balance in the apparatus. It will be clear, therefore, that if, during operation of the apparatus, the volatility of one of the liquid products should change, appropriate adjustment of any one, or more, of said valves is required to bring the volatility of said product back to its desired value.

As particularly shown in Figure 1, the means of the present invention is applied for producing the heavier fraction to have a constant volatility through control of the back-pressure valve 35 in accordance with the volatility of the sample in the sample cup 26. In the present arrangement, the supply valve 11 is of a differential diaphragm motor type and is controlled from an orifice plate 11' in the supply duct 9 whereby to insure a constant flow rate through the valve 11 even though the supply pressure should vary. The heating-coil valve 14 is a diaphragm valve which is operated by air pressure and is controlled by a thermostat 14' in accordance with the temperature of the liquid in the kettle whereby to maintain a constant temperature of said liquid. The condenser coil valve 33 may be an ordinary manually set throttle valve, as is indicated. The return-reflux valve 38 is also arranged to maintain a constant flow rate therethrough, and, as shown, preferably comprises a differential diaphragm motor valve which is controlled by and from an orifice plate 38' in the duct 36.

As shown, the sampling cup 26 is interposed in a duct which by-passes the valve 17 of the duct 15, said duct having portions 43 and 44 respectively providing inlet and discharge ducts for the cup. A throttle valve 45 for manual setting is provided in the duct 43 to adjust the flow rate to the cup. The cup 26 is sealed and the intake end of the duct 44 extends upwardly in the cup to an intermediate point thereof whereby the liquid sample is retained in the cup to the level thereof and an evaporation space 46 is defined above said liquid. A trap 47 is provided in the duct 44, said trap being preferably of a structure to maintain a generally constant degree of liquid seal therein under any pressures which may obtain in the cup; the details of the trap structure are not disclosed, as the specific structural details thereof are without the scope of the present invention.

It will now be noted that a vapor pressure will be set up in the constant-temperature sample in the sample cup in accordance with the volatility of the sample which constantly flows through the cup, said pressure changing if the sample volatility changes. Momentary changes in the volatility of the sample will, of course, produce a negligible effect on the cup pressure, but sustained changes in the volatility of the sample will change said cup pressure in accordance therewith. Since the volatility of a liquid changes with the temperature thereof, the automatic maintenance of a constant sample temperature, as by the previously described operation of the valve 24 by the thermostat 25, is, of course, an essential feature of the device.

The aforesaid vapor pressure in the sample cup is arranged to control the back-pressure valve 35 in such a manner that a change in the volatility of the sample will cause such a change in the tower pressure as will bring the volatility of the product back to its required value. Thus, should the volatility of the controlled product increase to produce an increased pressure in the sample cup, the back-pressure valve would be opened to lower the tower pressure and thereby decrease the volatility of the product, the kettle temperature being held constant by the hereinbefore described automatic operation of the heating-coil valve 14.

Since the pressure variations in the cup 26 are generally too slight to properly operate the motor valve 35, the cup pressure is preferably utilized to control an air valve 48 which in turn provides actuating air for the valve 35. As shown, the air valve 48 is of the double diaphragm type wherein a pair of pressure actuatable diaphragms 49 and 50 operate in opposition to control the setting of the valve. In the present instance, a duct 51 connects the cup 26 with the pressure chamber of the diaphragm 50, and the pressure chamber of the diaphragm 49 is connected to the vapor space of the tower 6 by means of a duct 52. The valve 48 is supplied with air from the air main 22. The size, or resistance to displacement, of the diaphragm 49 would be less than that of the diaphragm 50 to compensate for the general difference between the pressures in the tower and cup. A discharge duct 53 leads from the valve 48 to the pressure chamber of the back-pressure valve 35, and is provided with a constantly open branch 54 having a needle valve 55 operative therein. It is noted that the present manner of jointly using the tower and sample pressures as a control means for the valve 48 is particularly sensitive and insures a close regulation of the product through the control provided for the back-pressure valve 35, or any other valve of the apparatus which controls the operating pressure in the apparatus.

Referring now to the fragmentary showing of Figure 2, it is seen that an arrangement is there shown wherein the valve 233 of the cooling coil 32 is of the diaphragm motor type and is controlled from the sample cup in the manner described. The duct 34 is provided with an automatically operating back-pressure valve 235 in lieu of the motor valve 35 used in the first described embodiment; as particularly disclosed, the valve 235 is of a relief type which is controlled by a counterweight and is operative to maintain a constant and predetermined discharge pressure therethrough. This embodiment omits the pipe 39 for the discharge of part of the reflux and a float controlled valve 238 is interposed in the reflux recirculation pipe 36 in lieu of the valve 38; the valve 238 is operated by the level of the liquid in the accumulator portion of the condenser 31 whereby to maintain the constancy of said level. When the volatility of the sampled product increases, the diaphragm motor valve 233 is arranged to be throttled, thereby reducing the rates of condensation and recirculation of the reflux and the volatility of the reflux while increasing its temperature. The aforesaid changes in the quantity and qualities of the reflux returned to the tower results in an increase in the temperature at the top of the tower 6 whereby more of the lighter fractions escape from the liquor being treated and the volatility of the product is lowered to its desired value. During the aforesaid regulation, it will be understood that the pressure conditions are held constant through the automatic action of the back-pressure valve 235.

Comparing the showing of Figure 3 with that of Figure 1, it is seen that a diaphragm motor valve 333 which is controlled from the sample cup in the manner described replaces the valve 33 of the condenser coil 32, and the duct 34 is provided with an automatic back-pressure valve 335 in lieu of the valve 35, these being the only differences. In the present instance, an increase in the volatility of the sample is arranged to close the valve 333 whereby condensation is decreased while the temperature of the condensate is increased. This will result in a higher temperature at the top of the tower 6 due to the fact that a warmer reflux is returned through the duct 36 whereby more of the lighter fractions escape from the liquor being treated and the volatility of the liquid product is lowered. The present arrangement thus operates through the maintenance of constant pressure while the top tower temperature changes on account of the change in the temperature and composition of the reflux.

Another arrangement for controlling the volatility of the sampled product is disclosed in the fragmentary drawing of Figure 4 wherein the return flow of reflux through the duct 36 is controlled by a diaphragm motor valve 438 which replaces the constant flow valve 38 used in the first described embodiment. In the present form of the apparatus, an automatic back-pressure valve 435 is used in the gas discharge duct 34, replacing the diaphragm valve 35. The valve 438 is controlled by and from the sampling cup as in the other embodiments of the invention whereby an increased pressure in the sampling cup effects a closure of the valve 438 to reduce the amount of recirculated reflux and thereby increase the top tower temperature and so lower the volatility of the sampled product.

In the embodiment shown in Figure 5, the control is effected through the temperature in the kettle while the operating pressures are held constant. Accordingly the diaphragm motor valve 14 is connected to the air duct 53 for control by the sampling cup pressure rather than by a thermostat as before. Another difference is the replacement of the valve 35 of the first embodiment with a back-pressure valve 535 for automatically and independently maintaining a determined constant operating pressure in the apparatus; in the present instance, the valve 535 is shown as of a relief type which is regulated by an adjustable counter-weight. In the present instance, the air valve 48 is replaced by a single-diaphragm motor valve 548, which is operated solely by the cup pressure. The other parts and features of the present arrangement are as in Figure 1. In the present case, it will be understood that if the volatility of the sampled product increases, the increased cup pressure will open the valve 14 to increase the rate of heat supply from the coil 13 and so increase the effective heating temperature whereby the sampled liquid product from the kettle will be less volatile.

Essentially, the invention now disclosed is seen to concern a device for automatically maintaining the volatility of a distillate, or fraction, which is continuously produced by any suitable fractionating apparatus and to be applicable to other types of fractionating apparatus than that illustrated.

In illustrating the control operations of the various embodiments described, an increase above the desired volatility has been assumed in each case; it will be understood, however, that the disclosed control means will operate in an appropriate manner if the volatility of a product should become less than that desired.

It will be understood, furthermore, that control by and of the reflux liquid in the condenser 31 might be effected by the appropriate installation of the present device if such should be preferable. The latter application of the device is generally disclosed in my pending application Serial No. 330,121, filed January 3, 1929, wherein the temperature of a freely evaporating sample is arranged to control the product. In either event, the volatility of the controlled product is continuously operative to automatically so regulate the apparatus producing the same that the volatility of the product is constant.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. In continuously operating apparatus for fractionating a liquid mixture by evaporation, means to adjustably control the operating pressure of the apparatus, means to adjustably control the operating temperatures in the apparatus, means to adjustably and independently control the fluid flow rates of the mixture and its separated fractions in the apparatus, a closed unheated evaporation cup, means supplying a continuously flowing sample of a liquid product of the apparatus to and through said cup at a constant temperature and for evaporation at said temperature, and means continuously and automatically operated by the vapor pressure in said cup to so operate a said control means that the vapor pressure of said product will have a constant value as the same is produced by the apparatus, the settings of the remaining said control means remaining constant.

2. In continuously operating apparatus for fractionating a liquid mixture, valve control means for setting to maintain a constant operating pressure of the apparatus, valve control means for setting to maintain constant operating temperatures in the apparatus, valve control means operative to maintain appropriate fluid flow rates of the mixture and its fractions in the apparatus, a closed unheated evaporation cup, means supplying a sample of a liquid product of the apparatus continuously to and through said cup at a constant temperature below a boiling temperature for the product, and means directly operated by the vapor pressure in said cup to so actuate a valve of a said control means that the vapor pressure of the product will have a constant value as the said product is produced, the settings of said other valve control means remaining constant.

FLOYD L. KALLAM.